Aug. 2, 1960  H. J. HALL  2,947,920
MAGNET APPARATUS
Filed Jan. 30, 1958  2 Sheets-Sheet 2
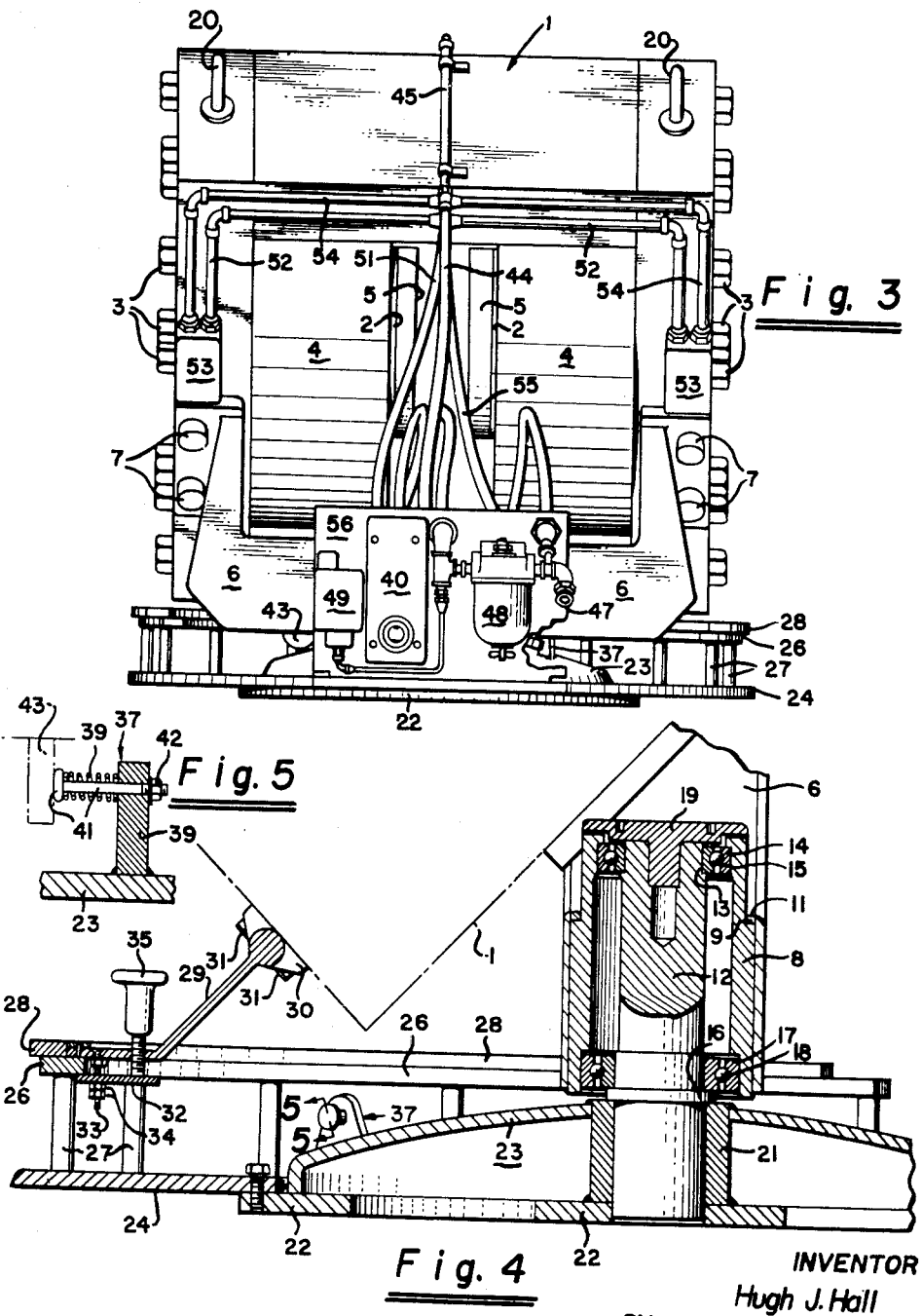
INVENTOR
Hugh J. Hall
BY
Paul B. Hunter
Attorney

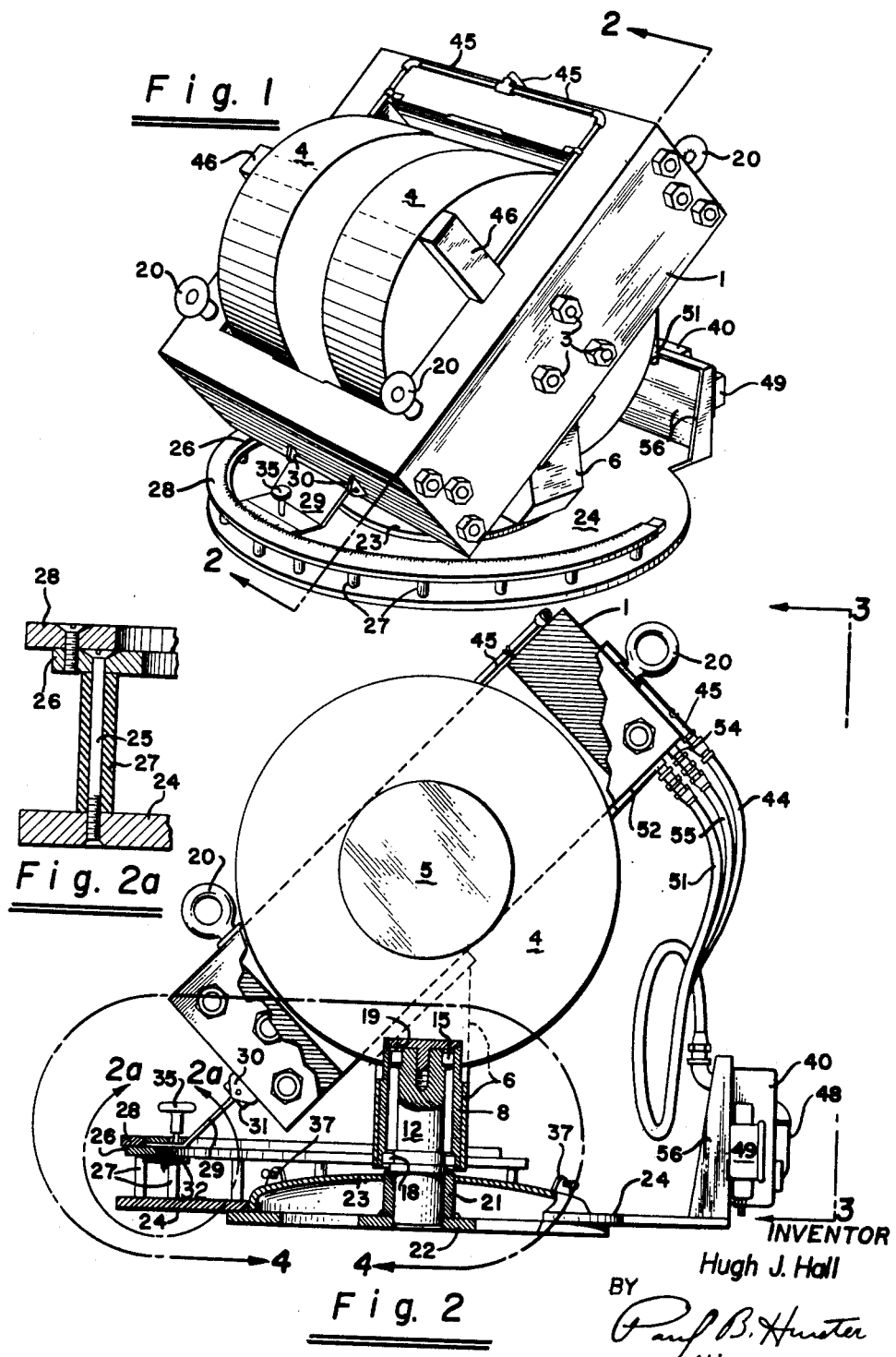

United States Patent Office 2,947,920
Patented Aug. 2, 1960

2,947,920

MAGNET APPARATUS

Hugh J. Hall, Los Altos, Calif., assignor to Varian Associates, Palo Alto, Calif., a corporation of California Filed Jan. 30, 1958, Ser. No. 712,204

5 Claims. (Cl. 317—158)

The present invention relates in general to magnet apparatus and more specifically to a novel magnet structure capable of providing a magnetic field of high intensity and having a high degree of homogeneity. The present novel magnet is extremely useful, for example, in providing the homogeneous magnetic field required for gyromagnetic spectroscopy, bending of high energy charged particle beams, and for other important scientific uses.

In certain gyromagnetic resonance experiments, for example, electron paramagnetic resonance analysis of certain crystalline structures it is desired to obtain a relative rotation between certain axes of the crystal under observation and the direction of the magnetic field in which the crystal is disposed. Heretofore specially designed probes have been made to contain the crystal therewithin. The probe assembly was inserted within the field of a powerful electromagnet. Within the probe structure there was also provided a means for holding the crystal and a means for obtaining rotation of the crystal through the intermediary of a gear train having an extension extending outwardly of the magnet structure for rotation by the operator. Such an apparatus required the provision of a substantial amount of mechanical apparatus disposed in close proximity to the crystal. It was extremely difficult to prevent perturbation of the magnetic field by the crystal rotating mechanism thereby destroying the magnetic field homogeneity over the crystal volume. In addition it was extremely difficult to determine the exact orientation of the crystal after making an adjustment of its orientation in the magnetic field due to the deficiencies of the associated gear train and crystal holder.

The present invention provides a novel magnet structure having the yoke of the magnet carried at an angle to the vertical axis whereby the magnet gap is made easily accessible along both the vertical and the horizontal axes. In addition, the magnet structure is supported such that the magnet may be rotated about the stationary sample without disturbing the latter and which sample is inserted into the gap along the vertical axis. In this manner relative orientation between a sample held within the gap of the magnet and the direction of the magnetic field may be easily changed without perturbing the magnetic field. Azimuth indicating means are included for easily determining the relative orientation of the sample within the magnetic field.

The principal object of the present invention is to provide a novel magnet structure which is easily accessible from the vertical and horizontal planes and which may be rotated about its vertical axis to precise easily ascertained angles and held there against inadvertent changes in azimuth.

One feature of the present invention is the provision of a rotatable magnet structure permitting rotation of the magnetic field in a plane at an angle to the axis of rotation, whereby the orientation of the magnetic field, in the plane of rotation, may be altered as desired.

Another feature of the present invention is the provision of a magnet structure wherein the magnet yoke is fixedly mounted at an angle to the vertical axis thereby facilitating access to the magnet gap from both the vertical and horizontal planes.

Another feature of the present invention is the provision of a novel azimuth scale mounted parallel to the plane of rotation of the magnetic field for indicating the orientation of the magnetic field about the axis of rotation.

Another feature of the present invention is the provision of a novel locking mechanism for locking the rotatable magnet structure to prevent inadvertent angular adjustments.

These and other features and advantages of the present invention will become apparent from a perusal of the specification taken in connection with the accompanying drawings wherein, Fig. 1 is a perspective view of the novel magnet structure of the present invention, Fig. 2 is a side elevation partly in cross section of the structure of Fig. 1 taken along line 2—2 of Fig. 1 in the direction of the arrows, Fig. 2a is an enlarged cross sectional view of a portion of the structure of Fig. 2 delineated by line 2a—2a of Fig. 2.

Fig. 3 is an elevational view of the structure of Fig. 2 taken along line 3—3 of Fig. 2 in the direction of the arrows, Fig. 4 is an enlarged cross sectional view of a portion of the structure of Fig. 2 delineated by line 4—4 of Fig. 2, and Fig. 5 is an enlarged cross sectional view of a portion of the structure of Fig. 4 taken along line 5—5 of Fig. 4 in the direction of the arrows.

Referring now to the figures there is shown the novel magnet structure of the present invention. A rectangular magnet yoke 1 as of, for example, iron carries two reentrant magnetic pole pieces 2 as of, for example, iron via a plurality of bolts 3 which are threaded into tapped holes in the reentrant pole pieces 2 and serve to pull the pole pieces 2 tightly against the yoke 1. Electromagnetic coils 4 circumscribe each of the reentrant pole pieces 2 and are carried therefrom. The pole pieces 2 extend through the electromagnetic coil assemblies 4 and each pole piece 2 is capped with a polished pole cap 5 as of, for example, iron. The pole caps 5 are fixedly secured to the pole pieces 2 as by, for example, a plurality of flush mounted cap screws not shown.

A hollow U-shaped yoke support 6 carries the rectangular magnet yoke 1 substantially at 45° to the vertical. The hollow yoke support 6 is made of, for example, half inch sheet steel welded together to form a unitary structure. The yoke support 6 is fixedly secured at its ends to the under side of the magnet yoke 1 via a plurality of bolts 7 which extend through holes in flanged ends of the yoke support 6 and into suitably bored and tapped holes in the magnet yoke 1. The U-shaped yoke support 6 (see Fig. 4) is bored along its axis of symmetry to receive a hollow sleeve 8 as of, for example, steel having an outer shoulder 9 abutting an inner shoulder 11 of the yoke support 6.

The hollow sleeve 8 receives therewithin a solid cylindrical axle 12 as of, for example, steel. The axle 12 is provided with an outer shoulder 13 near its free end portion which cooperates with an inner shoulder 14 of the hollow sleeve 8 substantially at the free end portion thereof. The shoulders 13 and 14 capture therebetween a ball bearing and race assembly 15 carrying both a radial and thrust load. The axle 12 is provided with another outer shoulder at 16 for cooperation with an inner shoulder 17 of the hollow sleeve 8 to capture therebetween a second ball bearing race assembly 18 carrying a radial load.

The axle 12 is centrally bored at its free end portion and tapped to receive a cap 19 of as, for example, steel. The cap 19 serves as a dust cover to prevent dust and dirt from entering into the bearing assemblies and prevents the base assembly from parting with the yoke assembly when the magnet is lifted by the lifting eyes 20. The axle 12 is fixedly carried at its base end within a cylindrical collar 21 as of, for example, steel. The collar 21 is mounted in a vertical position and is carried from a centrally apertured circular base plate 22 as of, for example, steel. An inverted dish-shaped pedestal fairing 23 is centrally apertured to circumscribe the cylindrical collar 21 and at its outside peripheral edge is fixedly secured to the base plate 22. An annular plate 24 as of, for example, half inch steel is fixedly secured as by, for example, cap screws to the circular base plate 22. The annular plate 24 is provided with a plurality of spaced holes about its peripheral edge. The spaced holes in the annular plate 24 are suitably tapped to receive a plurality of cap screws 25.

A first ring segment 26 (see Fig. 2a) comprising approximately 200° of arc is fixedly secured to the annular plate 24 via the cap screws 25 which extend through aligned holes in the ring segment 26, hollow cylindrical spacers 27 and into the tapped holes in the annular plate 24. A second approximately 200° ring segment 28 is fixedly secured to the first ring segment 26 via the intermediary of a plurality of cap screws. The second ring segment 28 is suitably indexed in units of degrees and minutes thereby forming an azimuth index.

An index bracket 29 having a flanged end portion 30 is fixedly secured to the magnet yoke 1 via a plurality of cap screws 31 extending through holes provided in the flanged portion of the index bracket 29 into tapped bores in the magnet yoke 1. The index bracket 29 has a horizontal portion thereof extending into close proximity to the azimuth indexed ring segment 28. This horizontal portion of the index bracket 29 is provided with a scribed index vernier fixedly secured thereto for cooperation with the indexed ring segment 28 to give accurate azimuth readings.

A gripping plate 32 (see Fig. 4) is pivotably supported from the index bracket 29 via a plurality of spaced bolts 33 threaded into tapped bores in the index bracket 29 and having locking nuts 34 threaded thereon and forming the pivot for the pivoted gripping plate 32. One end of the gripping plate 32 rides under the inside edge of the first ring segment 26. The other end of the gripping plate 32 has a perpendicular force applied thereto via a locking screw 35 threaded through a tapped bore in the index bracket 29 and having its lower end portion bearing upon the gripping plate 32.

Angular travel stops 37 (see Fig. 5) are fixedly carried upon the pedestal fairing 23 approximately 200° apart in arc. The angular travel stops 37 comprise a centrally apertured support member 38 as of one inch sheet steel fixedly secured to the pedestal fairing 23 as by, for example, welding. A coiled compression spring 39 is captured between the base support member 38 and a rod 41 having a flared end portion and having its central portion extending substantially coaxially of the spring through the central aperture of the base support 38 and terminating in a nut 42. A downwardly protruding tab 43 (see Fig. 3) as of, for example, one inch steel plate is fixedly secured to the U-shaped yoke support 6 for cooperation with the spring loaded angular travel stop 37 to prevent excessive angular rotation of the magnet structure about the vertical axis.

In operation the direction of the magnetic field within the gap of the magnet structure may be varied to any desired angular setting by grasping the yoke as by, for example, the lifting eyes 20 and swinging the magnet about the vertical axis to the desired position as shown on the azimuth scale opposite the index scribe on the index bracket 29. The magnet structure may then be locked in position by tightening locking screw 35 and forcing the gripping plate 32 to grasp the first ring segment 26 and thereby prevent inadvertent azimuth changes. When the magnet structure is in rotation the magnet yoke 1, U-shaped support 6, and hollow sleeve 8 rotate about the stationary axle 12 upon the bearing and race assemblies 15 and 18.

Direct current for energization of the electromagnetic coils 4 of the magnet structure is supplied from a magnet supply, not shown, thence to a surge preventer 40, which comprises a sphere gap, not shown, electrically in parallel with the coil assemblies 4 to prevent excessive voltages from being developed within the electromagnet coils 4 when the current thereto is suddenly turned off. The output of the surge preventer 40 is fed via an electrical cable carried within a flexible rubber hose 44 to a metal electrical conduit 45. The electrical metal conduit 45 carries and physically shields the electrical cables to the magnet terminal box 46 within which electrical connections are made to the various coils forming the electromagnetic coil assemblies 4.

In use a fluid coolant is circulated through the electromagnetic coil assemblies 4 to keep them cool. The coolant as of, for example, water enters an intake pipe 47 and thence is fed through a commercially available filter 48 serving to filter out undesired debris which may otherwise clog the coolant carrying tubes within the electromagnetic coil assemblies 4. The fluid pressure output of the filter 48 is monitored via a commercially available pressure switch 49 which is electrically connected to the magnet power supply. The pressure switch 49 is set to turn the magnet current off if an excessive fluid coolant pressure is sensed, indicating a clog in the cooling coils of the electromagnet thereby preventing overheating of the electromagnetic coils 4. The pressure regulated fluid output is then fed via flexible hose 51 and pipes 52 to a coolant intake manifold, not shown, contained within a coolant distribution box 53. The coil exhaust coolant enters the exhaust coolant manifold portion of coolant distribution box 53 after passing through the electromagnetic coil assembly 4 and thence is fed via pipes 54 and a flexible hose 55 to a drain or heat exchanger, not shown. The pressure regulator 49, surge preventer 40 and filter 48 are carried upon a suitable bracket 56 which is fixedly secured at its base to the annular base plate 24.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A magnet apparatus including a rectangular magnetic yoke having mutually opposing spaced apart re-entrant portions defining a magnetic gap therebetween, a substantially U-shaped yoke supporting member fixedly secured to said rectangular magnetic yoke and holding said yoke in a plane defined by said rectangular yoke substantially at 45° to the vertical, said U-shaped yoke supporting member having a bore extending substantially along the axis of symmetry thereof, a substantially stationary base member, a vertically disposed axle member coaxially disposed within the bore of said U-shaped yoke supporting member, a bearing captured between said vertical axle and said U-shaped yoke supporting member to allow free rotation of said magnetic yoke about said vertical axle, an azimuth scale fixedly coupled to said base member, and an index bracket fixedly coupled to said rectangular magnetic yoke for cooperation with said azimuth scale to give a precise measurement of the orientation of the magnetic field with respect to said stationary base member, as desired.

2. In an apparatus as claimed in claim 1 including a gripping plate pivotably carried by said index bracket, and locking screw means for applying a force substantially at one end of said gripping plate thereby causing said pivoted gripping plate to firmly grasp a segment of an annular member fixedly coupled to said base member thereby locking said rectangular magnetic yoke against inadvertent angular adjustments thereof.

3. A magnet locking apparatus including a stationary base, a magnetic yoke mounted for rotation about said stationary base, a thin ring fixedly coupled to said stationary base, a bracket fixedly secured to said magnetic yoke substantially at one end thereof and having a free end portion closely spaced to said ring, a gripping plate pivotably carried upon said bracket and having an end portion thereof riding adjacent the stationary ring, and screw means carried by said bracket and adapted to operate upon said pivoted gripping plate to produce a frictional bearing between said gripping plate and said ring, thereby locking said magnetic yoke against inadvertent rotational movement thereof, as desired.

4. The apparatus according to claim 3 including an azimuth scale fixedly coupled to said ring and cooperating with a vernier provided on said bracket to indicate relative orientation of said magnetic yoke with respect to said stationary base.

5. A homogeneous field rotatable magnet apparatus including, a closed magnetic yoke having mutually opposing spaced apart re-entrant portions defining a magnetic gap therebetween, the gap having a region of homogeneous field therein, a forked yoke supporting member fixedly secured to said closed magnetic yoke and holding said yoke in a plane defined by said closed yoke at a substantial angle both to the vertical and to the horizontal planes to facilitate access to the magnetic gap from both the horizontal and vertical directions, said forked yoke supporting member having a vertically directed bore therein, a substantially stationary base member, a vertically disposed axle member coaxially disposed within the vertical bore of said forked yoke supporting member, a bearing captured between said vertical axle and said yoke supporting member to allow rotation of said magnetic yoke about said vertical axle, two azimuth indicating members including an azimuth scale and an azimuth index, one of said azimuth indicating members fixedly coupled to said stationary base member and the other of said azimuth indicating members fixedly coupled to said rotatable closed magnetic yoke, and said indicating members cooperating together to give a precise measurement of the orientation of the magnetic field with respect to said stationary base member, as desired.

References Cited in the file of this patent

UNITED STATES PATENTS

| | | |
|---|---|---|
| 2,461,864 | Zuschlag | Feb. 15, 1949 |
| 2,537,753 | Hansen | Jan. 9, 1951 |
| 2,556,199 | Lee | June 12, 1951 |

OTHER REFERENCES

U.S. Department of Commerce, National Bureau of Standards, Research Paper RP 2104, vol. 44, June 1950, article by Thomas et al.